United States Patent
Halwes

(10) Patent No.: US 6,371,408 B1
(45) Date of Patent: Apr. 16, 2002

(54) HELICOPTER TAIL ROTOR AUTHORITY ALTITUDE COMPENSATOR

(76) Inventor: Dennis Halwes, 3448 Indian Trail, Arlington, TX (US) 76016

( * ) Notice: Subject to any disclaimer, the term of this patent is extended or adjusted under 35 U.S.C. 154(b) by 0 days.

(21) Appl. No.: 09/632,041

(22) Filed: Aug. 3, 2000

(51) Int. Cl.[7] ................................................ B64C 11/34
(52) U.S. Cl. .................................. 244/17.13; 244/17.19
(58) Field of Search ........................... 244/17.13, 17.19, 244/17.4, 221, 232

(56) References Cited

U.S. PATENT DOCUMENTS

| | | | |
|---|---|---|---|
| 3,761,693 A | * | 9/1973 | Fleury |
| 3,833,188 A | * | 9/1974 | Robinson |
| 4,759,514 A | * | 7/1988 | Burkham |
| 5,131,604 A | * | 7/1992 | Yoerkie et al. |
| 5,428,543 A | * | 6/1995 | Gold et al. |
| 5,607,122 A | | 3/1997 | Hicks et al. |

* cited by examiner

Primary Examiner—Peter M. Poon
Assistant Examiner—Tien Dinh
(74) Attorney, Agent, or Firm—Michael B. Jolly

(57) ABSTRACT

Apparatus and methods for automatically altering tail rotor authority on a helicopter based on ambient air pressure and temperature changes utilizing a sealed bellows which extends or retracts based on temperature and or pressure changes thereby moving a target attached thereto. Target position movement is sensed by proximity sensors which in turn activate relays operating a drive motor which changes the pivot position of a walking beam, bell crank or other tail rotor pitch control mechanism positioned between a manual input linkage and an output linkage extending to the tail rotor pitch control thereby altering the maximum tail rotor control, tail rotor authority available by a given movement of the manual input linkage while concurrently controlling the alignment of the proximity sensors so that the target is maintained between the proximity sensors. The apparatus and methods provide a system for easily and inexpensively adapting helicopters to operate at higher altitudes since the density altitude compensator described herein automatically allows progressively higher tail rotor blade angles as the density of the air falls or temperature increases, thus allowing increased tail rotor control in hot, high conditions and vice versa without the need for complex microprocessor or other logic circuits.

17 Claims, 9 Drawing Sheets

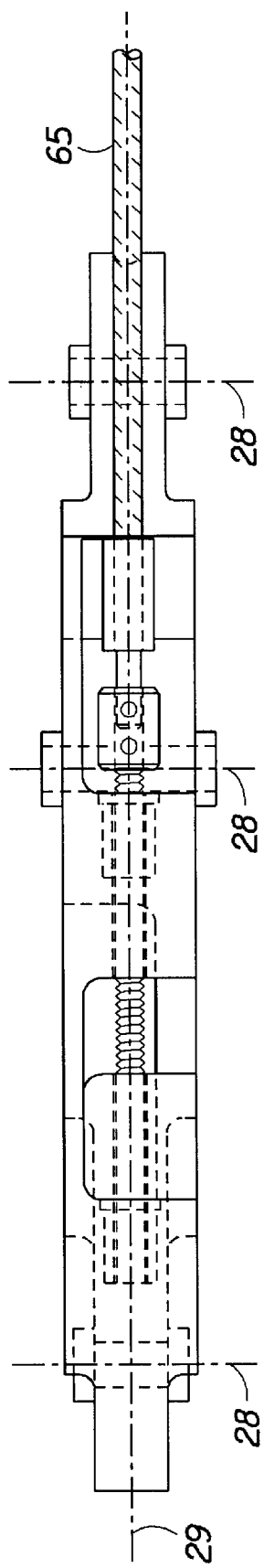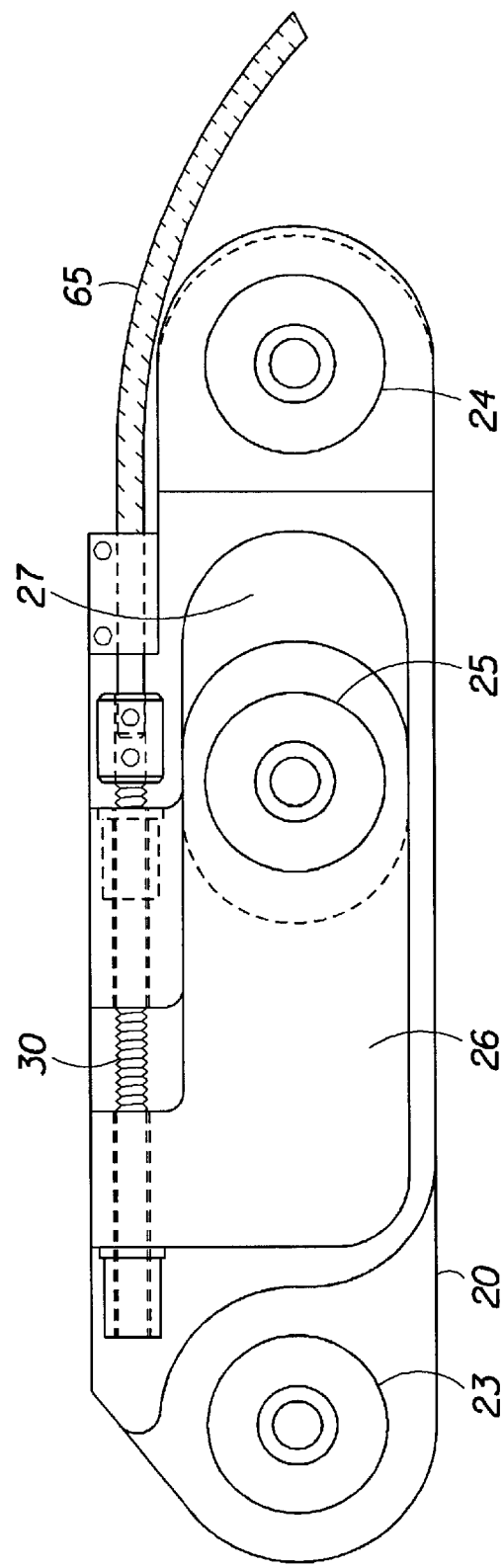

HELICOPTER TAIL ROTOR AUTHORITY ALTITUDE COMPENSATOR

TECHNICAL FIELD

The present invention relates to devices and methods for controlling helicopter tail rotor authority and more particularly to devices and methods for automatically altering the maximum input of tail rotor pitch on a helicopter based on altitude and temperature so that as ambient air pressure increases or temperature decreases the maximum input to tail rotor blade angle and authority decreases, and as ambient air pressure decreases or temperature increases the maximum input of tail rotor blade angle and authority increases. The system utilizes a set of proximity sensors which sense the position of a target mounted to an end of a sealed bellows assembly which lengthens or shortens based on atmospheric pressure and temperature changes, the sensors send electrical signals to an array of relays which operate a drive motor altering the geometry of a pivoting linkage member positioned between a manual input linkage and an output linkage while concurrently maintaining alignment of the proximity sensors with the target. The bellows is sealed and charged with a known volume of gas and reacts by lengthening or shortening based on either or both pressure and temperature changes.

BACKGROUND ART

Helicopters may be generally group by altitude performance operating limits, which is partly a result of design necessitated by ambient atmospheric conditions encountered. The tail rotor, which produces a maximum sideways thrust known as "tail rotor authority" is likewise designed to operate appropriately in expected ambient atmospheric conditions. A tail rotor and helicopter designed for operating at lower altitudes is unable to maneuver in higher altitudes because the tail rotor pitch angle will not adjust to produce a necessary tail rotor authority, while a tail rotor and helicopter designed for higher altitudes is over designed for lower altitudes. Tail rotor authority is affected by and may be altered by changing one of the following; tail rotor blade size, blade profile, tail rotor blade speed, the angle of attack of the tail rotor blade, the pitch of the tail rotor blades, and air density. In order to safely operate a helicopter in both lower and higher altitudes one or more of the these would need to be altered and of these possibilities it is easiest and preferable to vary the tail rotor blade pitch based on the given air density. Other changes, such as blade profile and size would require the helicopter to be requalified which is not economically feasible. Focusing only on air density with all other factors remaining constant, as air density decreases tail rotor authority decreases, and inversely as air density increases tail rotor authority increases. Air density generally increases as atmospheric pressure increases at lower altitude and temperature and air density decreases as atmospheric pressure decreases at higher altitudes and temperatures. The present invention utilizes a sealed and charged bellows which reacts to ambient air pressure and temperature changes by altering in length. Movement of a target attached to a moving end of the bellows is detected by proximity sensors which in turn activate an array of relays sending electrical signals to a drive motor which varies both the position of the proximity sensors in relation to the target and the pivot position of a pivoting linkage member positioned between an input linkage and an output tail rotor pitch control linkage. Accordingly, movement of the pivot point is directly related to linear movement of the target attached to the moving bellows end via the proximity sensors. The present invention does not utilize a microprocessor or other logic circuit and is thus a simplification of the tail rotor control described by the Russian helicopter manufacturer for its tail rotor pitch foot control dated Jun. 1, 1979 "service manual" and later in U.S. Pat. No. 5,607,122 to Hicks et al. Both the Russian service manual and the Hicks patent disclose a tail rotor authority and control for a helicopter which includes a variable geometry linkage member positioned between the manual tail rotor input linkage and tail rotor angle control, an actuator and a control unit. The actuator changes the configuration of the linkage member variable geometry in response to an actuator movement signal. The control unit includes a microprocessor which receives information concerning ambient conditions from various sensors and calculates and determines a desired actuator position corresponding to a desired maximum tail rotor pitch and provides corresponding actuator movement signals. The Hicks disclosure includes an excellent discussion of the advantages and operation of a variable tail rotor authority control. The present invention differs from Hicks and the Russian service manual in simplification of operation while achieving substantially similar tail rotor authority control limits.

GENERAL SUMMARY DISCUSSION OF INVENTION

It is thus an object of the invention to provide a helicopter tail rotor authority altitude compensator which automatically alters the maximum input of tail rotor pitch and tail rotor authority on a helicopter based on altitude and temperature so that as ambient air pressure increases or temperature decreases the maximum input to tail rotor blade angle and authority decreases, and as ambient air pressure decreases or temperature increases the maximum input of tail rotor blade angle and authority increases.

It is a further object of the invention to provide a helicopter tail rotor authority altitude compensator which utilizes a single ambient condition sensor in the form of a sealed bellows with a linearly moving end with a target attacked thereto and in alignment with a set of proximity sensors which sense the position of the target, the sensors send electrical signals to an array of relays which operate a drive motor altering the geometry of a pivoting linkage member positioned between a manual input linkage and an output linkage while also aligning and maintaining the target between the proximity sensors. The bellows reacts by lengthening or shortening based on either or both pressure and temperature changes.

It is a still further object of the invention to provide a helicopter tail rotor authority altitude compensator which automatically alters the geometry of the tail rotor pitch input linkage so that an appropriate tail rotor authority may be achieved at various altitudes and temperatures, where at a given ambient atmospheric pressure and temperature, maximum input to the tail rotor control linkage results in a sufficient tail rotor authority for proper control of the helicopter, and as ambient atmospheric pressure or temperature increases or decreases the tail rotor authority altitude compensator alters the input linkage geometry so that sufficient tail rotor authority is achieved at the given atmospheric conditions.

It is a still further object of the invention to provide a helicopter tail rotor authority altitude compensator which is greatly simplified from the prior art and which does not require the use of microprocessors or other logic circuits, which utilizes a single sealed bellows which reacts to both temperature and atmospheric pressure, and which compensator alters the geometry of the tail rotor pitch input linkage in relation to the linear movement of a target attached to a moving end of the sealed bellows.

It is a still further object of the invention to provide a helicopter tail rotor authority altitude compensator with a variable geometry input linkage including a walking beam with an adjustable position center pivot point positioned between an input pivot bearing for connecting a manual tail rotor pitch input control linkage and output pivot bearing for connecting an output tail rotor pitch control linkage, wherein the center pivot point is slidable and variable positioned between the input and output pivot bearing by the rotation of a drive motor which is controlled by the tail rotor altitude compensator and which alters the geometry of the walking beam so that a maximum input tail rotor pitch manual control linkage movement provides a tail rotor authority which is suitable for controlling the helicopter at given atmospheric conditions. The drive motor shaft linearly concurrently moves a proximity sensor mount in parallel alignment with a target mounted to a moving end of a sealed bellows while the target is maintained between proximity sensors mounted to the proximity sensor mount while also slidably and variably moving the center pivot point.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 6A is a side view of a variable geometry linkage member with an adjustable position center pivot point.

FIG. 6B is a top view of the walking beam of FIG. 6a.

EXEMPLARY MODE FOR CARRYING OUT THE INVENTION

Figure 1:
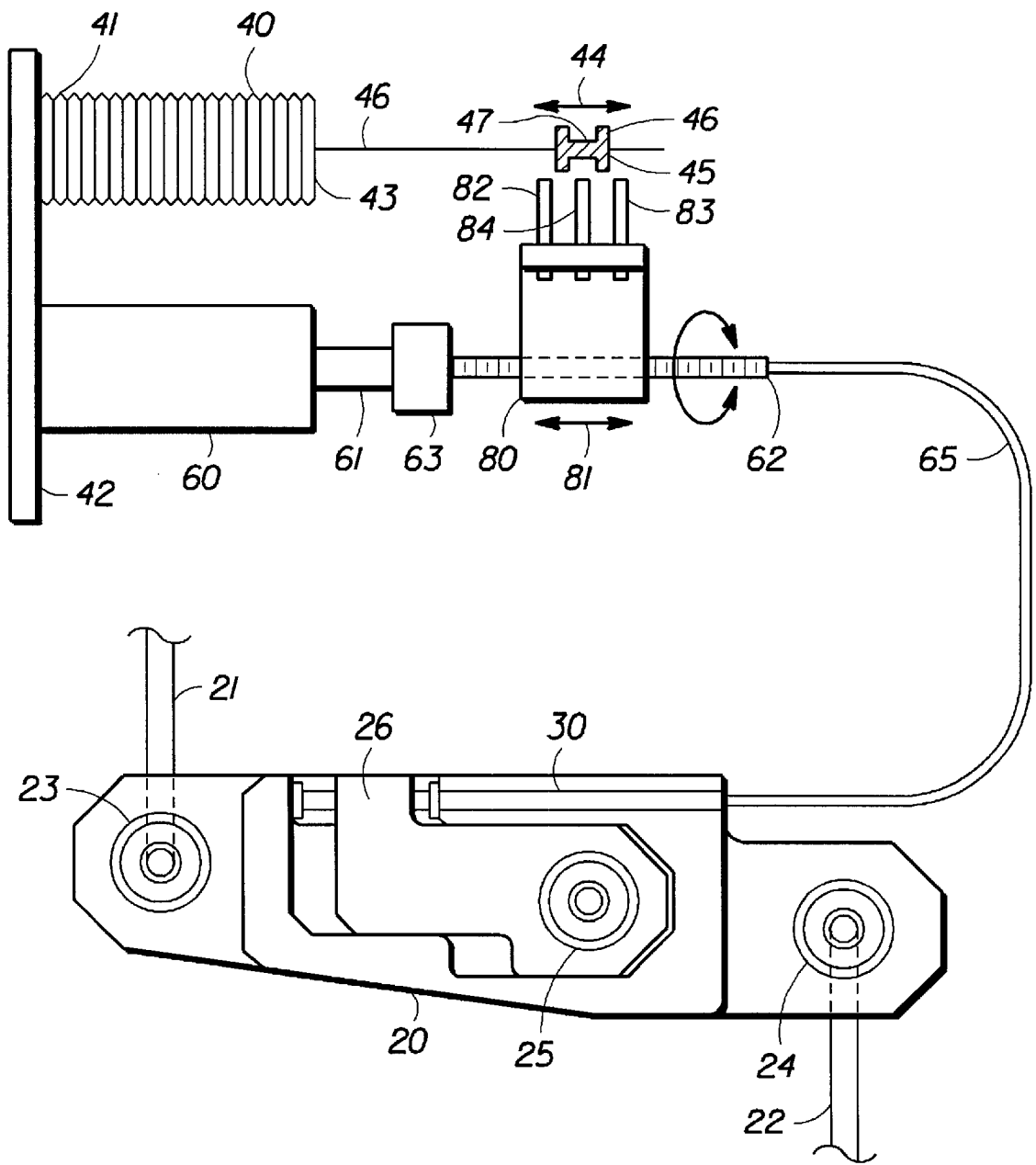
FIG. 1 is an illustration of the components of the tail rotor authority control apparatus including the bellows, drive motor, proximity sensor mount, flexible drive, and variable geometry linkage member.

The helicopter tail rotor authority altitude control compensator is adaptable for installation on existing helicopter tail rotor control linkage wherein a manual tail rotor pitch input linkage extends to a pivoting linkage member and an output tail rotor pitch control linkage extends from the pivoting linkage member to the tail rotor. The compensator changes the geometry of the pivoting linkage member so a given input movement of the manual tail rotor pitch input linkage provides either more or less tail rotor authority so that the achieved tail rotor authority corresponds to the ambient pressure and temperature. The controller for the compensator monitors ambient air pressure and temperature and alters the geometry of the variable geometry linkage member directly in relation to the movement of a moving of sealed bellows without the need for complex microprocessors or additional ambient condition sensors. FIG. 1 illustrates the general layout of the components of the compensator which includes the variable geometry linkage member 20, bellows 40, drive motor 60, proximity sensor mount 80, and flexible drive 100.

The variable geometry linkage member 20 is pivotally mounted between the manual input tail rotor pitch control linkage 21 and the output tail rotor pitch control linkage 22. The variable geometry control linkage 20 illustrated in FIGS. 1 and 6a–b is also known as a "walking beam" by those skilled in the art, and is pivotally mounted to a secured location on the helicopter with sufficient space for full pivotal movement. Pivot bearing 23 and 24 are provided for pivotally connecting both the output and input linkages to the variable geometry control linkage. While a pivoting bearing 25, mounted to a pivot bearing mount 26 is used to pivotally mount the variable geometry linkage member. The pivot bearing mount 26 is slidably positioned between the input and output pivot bearing 23 and 24 and captured by a contoured groove 27 to be retained by the linkage member 20 when sliding between the input and output pivot bearing in the directions as indicated by the double headed arrow on FIG. 1. The pivot bearing 23, 24, and 25 each have a center axis 28 which are essentially parallel and which are essentially perpendicular to the sliding movement of the pivot bearing mount 26. The pivot bearing mount 26 is threadingly engaged to a threaded shaft 30 so that shaft rotation provides captured sliding movement of the pivot bearing mount 26 within the linkage member 20. The threaded shaft is arranged essentially perpendicular to the center axis 28 of the pivot bearing.

Figure 4A:
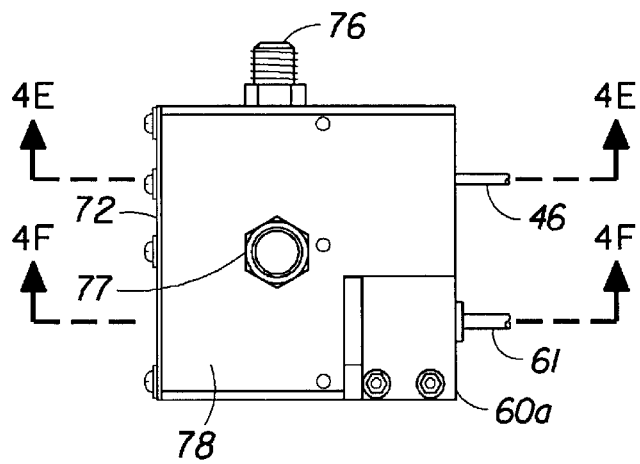
FIG. 4A is a top view of the drive motor and bellows unit.
Figure 4B:
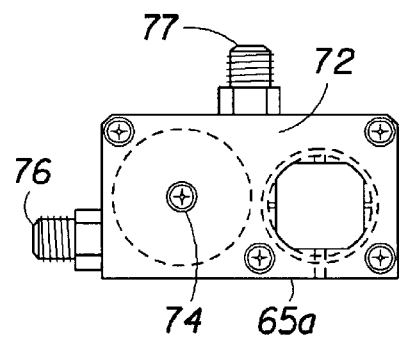
FIG. 4B is an end view of the drive motor and bellows unit as viewed from the outside end.
Figure 4C:
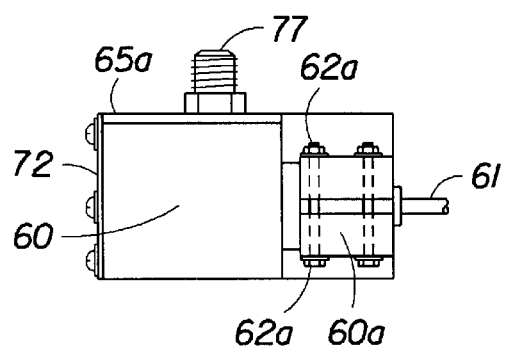
FIG. 4C is a side view of the drive motor and bellows unit taken from the drive motor side.
Figure 4D:
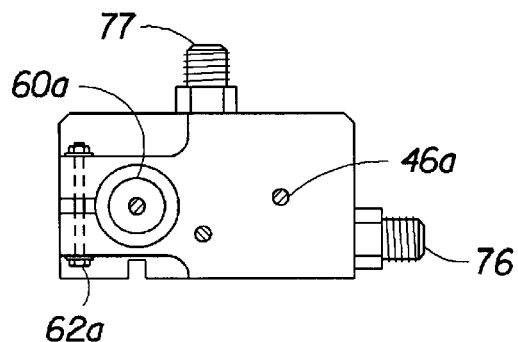
FIG. 4D is an end view of the drive motor and bellows unit as viewed from the drive motor shaft and bellows shaft end.
Figure 4E:
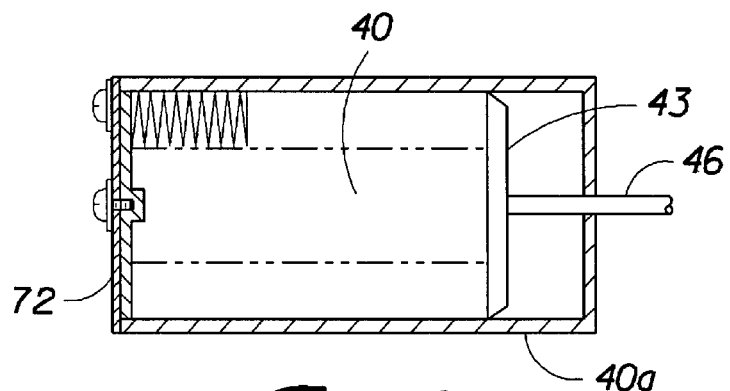
FIG. 4E is a cross section of the bellows unit taken along lines A—A of FIG. 4A.
Figure 4F:
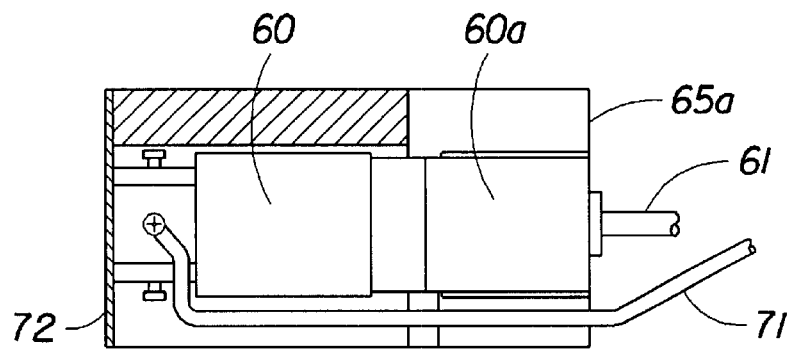
FIG. 4F is a cross section of the drive motor unit taken along lines B—B of FIG. 4A.
Figure 5A:
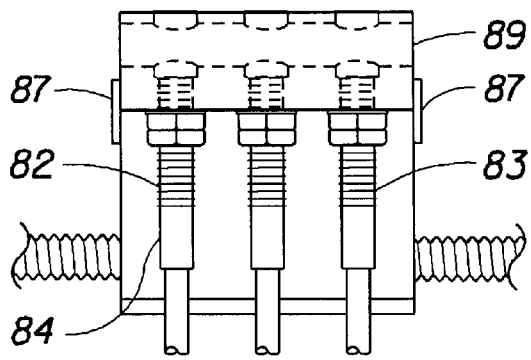
FIG. 5A is a top view of the proximity probe assembly.
Figure 5B:
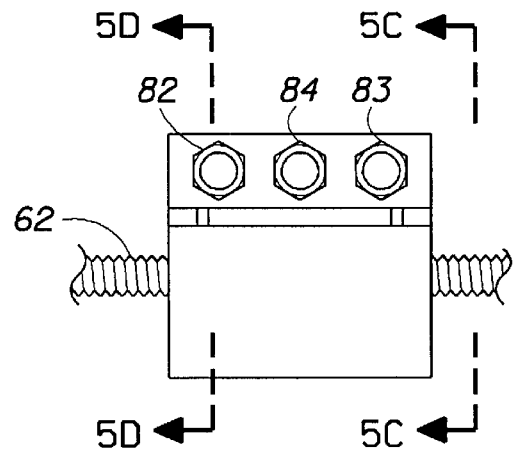
FIG. 5B is a side view of the proximity probe assembly as viewed from the drive motor side of the control box.
Figure 5C:
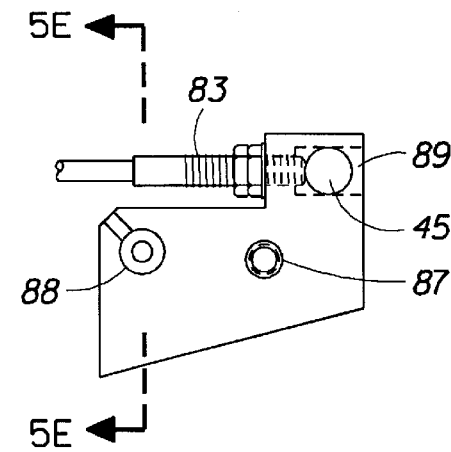
FIG. 5C is an end view of the proximity probe assembly as viewed with the drive motor shaft on the left of the assembly and the bellows shaft on the right of the assembly.
Figure 5D:
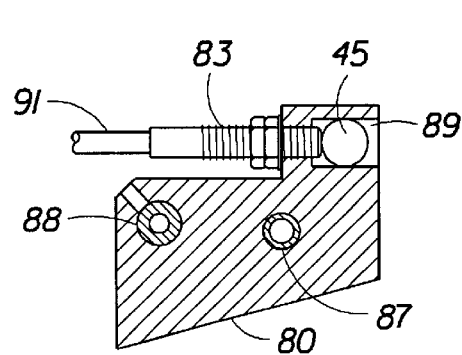
FIG. 5D is a cross section of the proximity probe assembly taken along lines C—C of FIG. 5B.
Figure 5E:
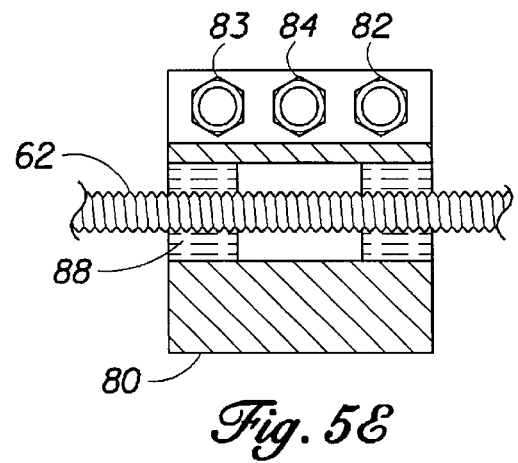
FIG. 5E is a cross section of the proximity probe assembly taken along lines D—D of FIG. 5C illustrating the drive motor shaft position through the assembly.

A bellows 40 is provided which is sealed and preferably filled with approximately one atmosphere of an inert gas, the bellows includes an end fixedly secured 41 to a base 42 and a moving end 43, the bellows reacts to changes in ambient air pressure and temperature by retracting in the presence of increased ambient air pressure and/or decreased ambient temperature and extending in the presence decreased ambient air pressure and/or increased ambient temperature. The retracting and extension movement of the moving end 43 of the bellows is essentially linear in the directions indicated by the double headed arrow labeled 44 on FIG. 1. A target 45 is attached to an extension rod 46 which is attached to a moving end 43 of the bellows and is used, in addition to the below described proximity sensors, to detect the position of the moving end 43 of the bellows. FIG. 4E illustrates a cross section of the bellows in detail wherein the bellows 40 is contained within a bellows chamber 40a for protecting the bellows and wherein the bellows chamber 40a is mounted within the unit 10 as illustrated in FIG. 4A. The target 45 is preferably magnetic or an optic reflector which facilitates detection of the target by an appropriate proximity sensor and may include a magnet or optic reflector 46 one each end of the target separated by a non sensor detectable area 47 so that proximity sensors detect only a portion of the target 45.

Drive motor 60 is mounted to base 42 and is preferably an electric DC motor but may also include a pneumatic motor or hydraulic motor. A drive motor gear box 60a is mounted between the drive motor 60 and the drive motor shaft 61. The gear box 60a is clamped by pinch bolts 62a to prevent movement and the drive motor 60 and the drive motor gear box 60a are contained within a drive motor unit 65a as illustrated in FIGS. 4F and 4A–D. Motor electrical wiring 71 is routed through a protected area for incorporation with the remainder of the electrical components. An end plate 72 is attached with screws 74 to the drive motor unit 65a and the bellows unit 40a for gaining entry into the unit and replacing the motor and other work as needed. The drive motor unit 65a and the bellows unit 40a are combined within one drive motor bellows unit 78. Two air inlet nipples 76 and 77 are attached to the drive motor bellows unit for providing ambient air to the units from two different origins. The motor shaft 61 is engaged to an all threaded shaft 62 with a slip clutch 63. The proximity sensor mount 80 is threadingly engaged to the all threaded shaft 62 while a flex shaft 65 extends through shaft end plate 12 and is coupled utilizing a coupler 13 to the all threaded shaft 62, the flex shaft extends to the threaded shaft 30 on the variable geometry linkage 20. The flex shaft 65 allows the variable geometry linkage member 20 to be easily placed in a remote location from the drive motor, bellows and proximity sensors. The threaded engagement of the proximity sensor mount 80 with the threaded shaft 62 and the threaded engagement of the pivot bearing mount 26 to the threaded shaft 30 include a thread pitch dimensioned which concurrently and linearly moves the proximity sensor mount 80 and the pivoting bearing mount 26 an appropriate amount which corresponds to both maintaining alignment of the proximity sensors with the target and altering the geometry of the variable geometry linkage member so a maximum tail rotor authority may be maintained which provides sufficient helicopter control at various altitudes and temperatures.

Figure 3A:
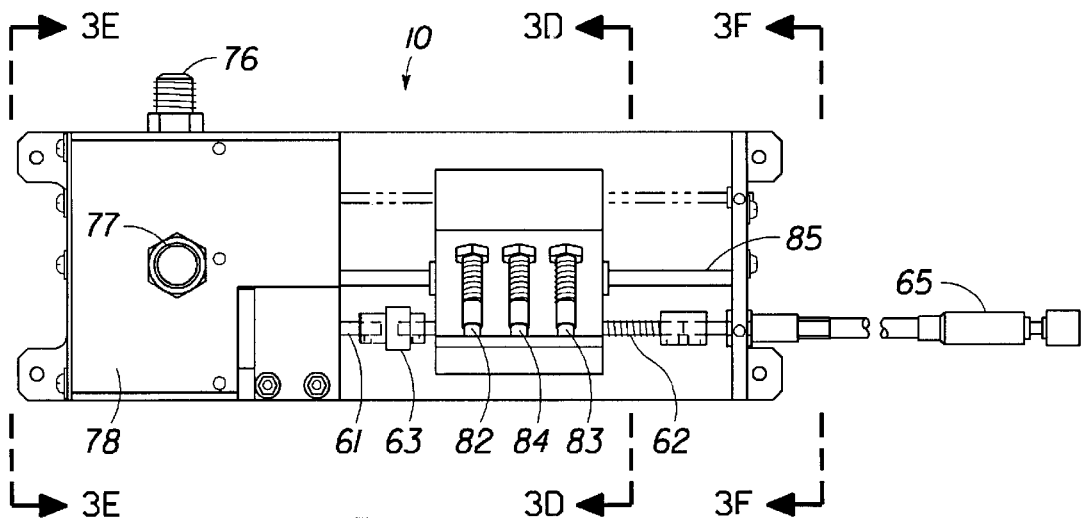
FIG. 3A is a top view of the control box with the cover and electronic control box removed illustrating the interior components of the control box including the proximity probe assembly, drive motor unit, and bellows unit.
Figure 3B:
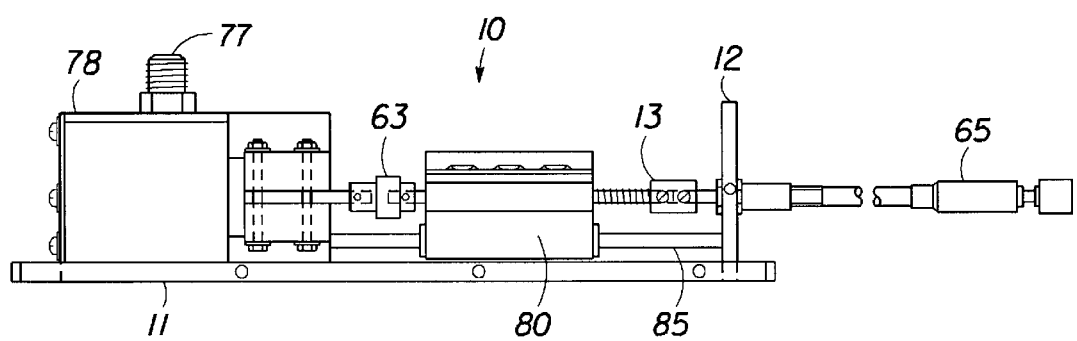
FIG. 3B is a side view of the control box as described in FIG. 3A.
Figure 3C:
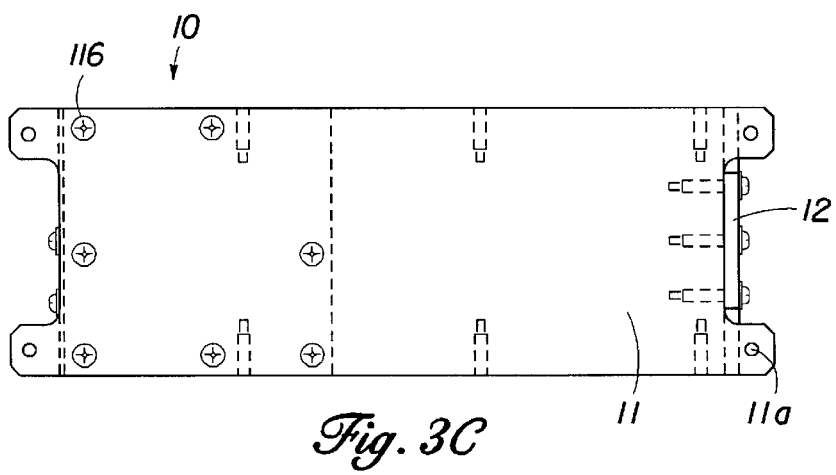
FIG. 3C is a bottom view of the control box.
Figure 3D:
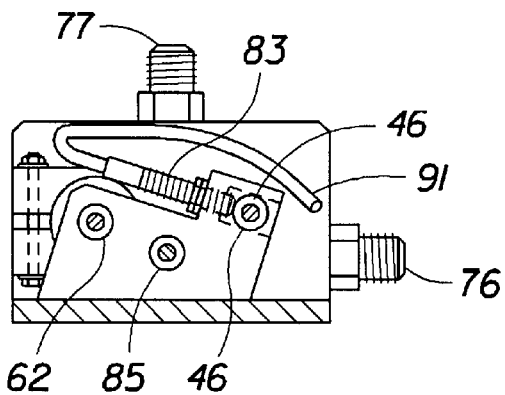
FIG. 3D is a cross section taken along lines F—F of FIG. 3B illustrating the arrangement and alignment of the proximity probes, bellows target, and drive motor shaft.
Figure 3E:
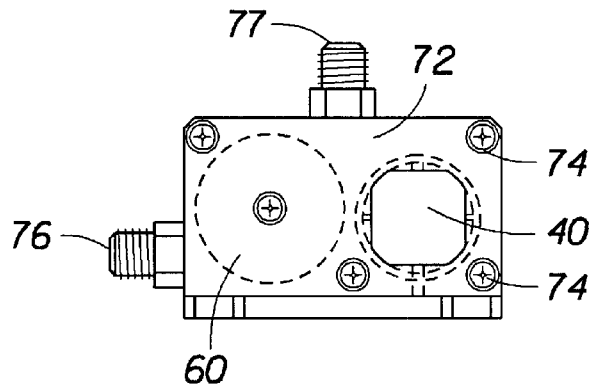
FIG. 3E is an end view of the drive motor and bellows unit.
Figure 3F:
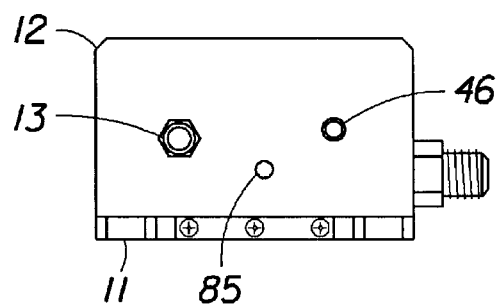
FIG. 3F is an end view of the drive shaft end of the control box.

Proximity sensor mount 80, as mentioned above, is threadingly engaged with threaded shaft 62 and prevented from rotation so that as the threaded shaft 62 is rotated by motor 60, the proximity sensor mount 80 moves in a linear direction as indicated by the double ended arrow labeled 81 on FIG. 1 which is parallel with the linear movement of the target 45. The proximity sensor mount 80 serves as a mount for a number of proximity sensors, one being a retract proximity sensor 82, an extend proximity sensor 83, and an overextend sensor 84. The proximity sensors 82, 83, and 84 are all securely fastened to the proximity sensor mount 80. FIGS. 3A, 3B and 3D illustrate the proximity sensor mount 80 mounted within a unit 10 wherein the unit 10 includes the drive motor 60, bellows 40 and the proximity sensor mount 80. The proximity sensor mount 80 is held in alignment with the target 45 by an idler shaft 85 which is parallel with the drive motor all thread shaft 62 and the bellows target extension rod 46 wherein the idler shaft 85 helps prevent the proximity sensor mount from binding up while sliding linearly as the all thread shaft 62 rotates. FIGS. 5A–E illustrate the proximity sensor mount in detail including aperture 87 for receiving idler shaft 85, threaded aperture 88 for receiving threaded all thread shaft 62, target through aperture 89 for allowing the target 45 to freely linearly move in relation to the mount 80. The proximity sensors 82, 83 and 84 are preferably optic or magnetic sensors which are secured in place by a suitable mount and are wired into the electrical circuit by wiring 91.

Figure 2A:
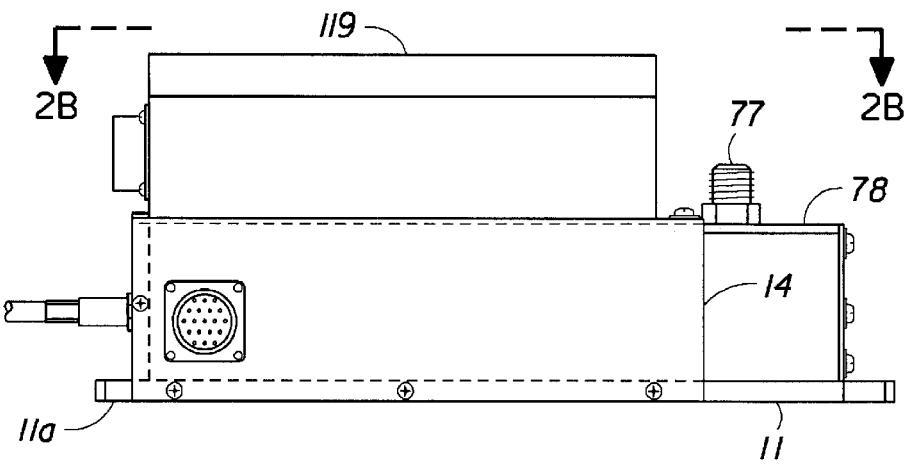
FIG. 2A is a side view of the control box which contains the drive motor, bellows, proximity probes, and electronic control box.
Figure 2B:
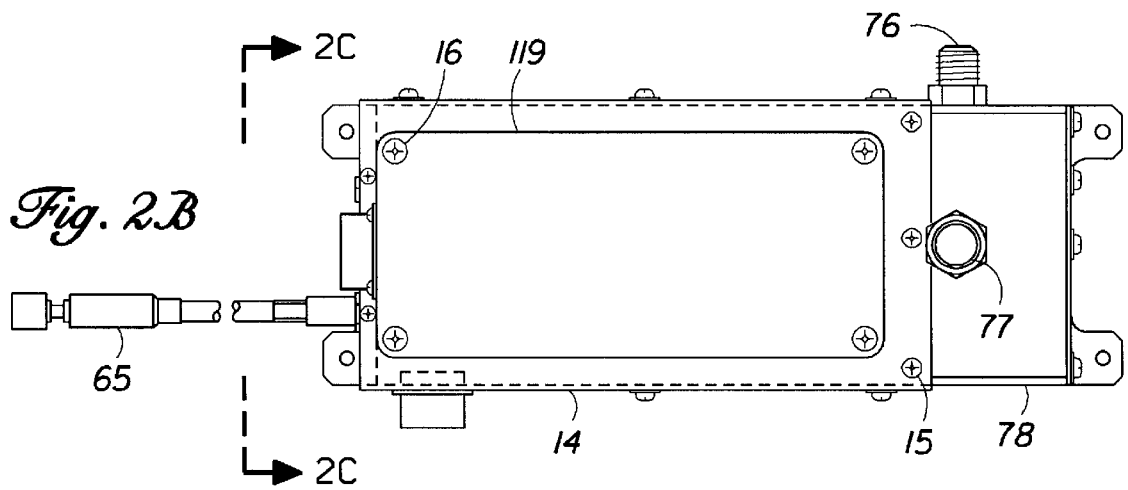
FIG. 2B is a top view of the control box
Figure 2C:
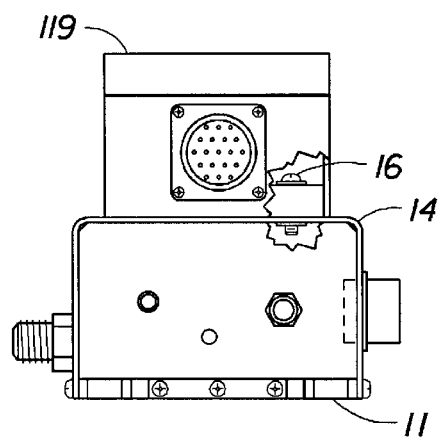
FIG. 2C is an end view of the control box from the drive shaft end.

Unit 10 consist of the drive motor bellows unit 78 and the proximity sensor mount, and includes a base frame 11, shaft end plate 12. The base 11 includes numerous mounting apertures 11a and through mounting screws 11b for mounting the components securely thereon. A cover 14 fastened by screws 15 shields the inner workings of the unit 10 and also provides an attachment area for the electrical control box 119 which is fastened by screws 16 to a top surface of the cover as illustrated in FIGS. 2A–C.

Figure 7:
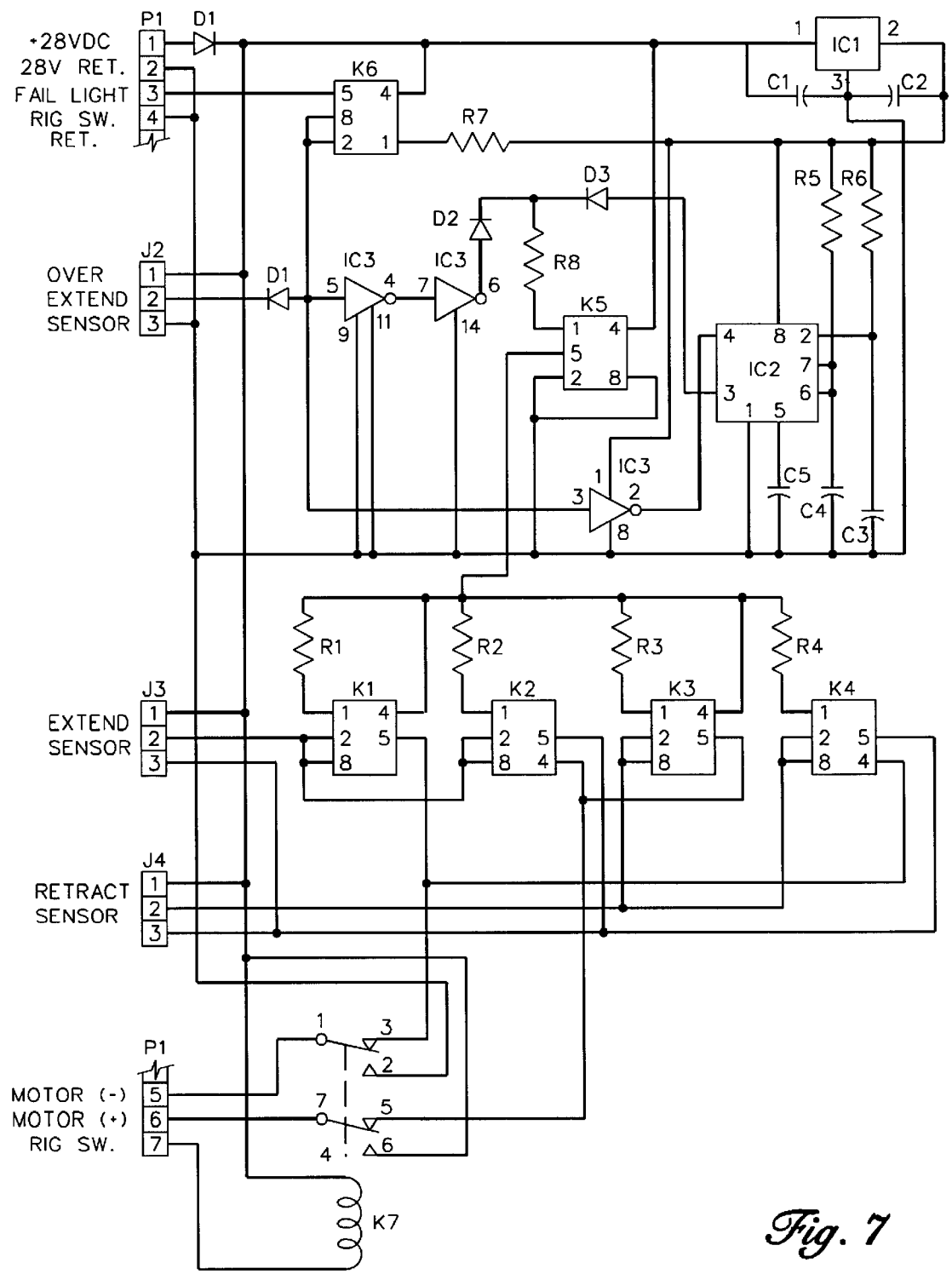
FIG. 7 is an electrical schematic of the electrical components of the tail rotor authority altitude compensator.

Circuitry 120 is illustrated in FIG. 7. The electrical circuitry receives electrical signals from the proximity sensors and use the signal to control the operation of the drive motor, direction specific, which concurrently aligns the proximity sensor mount thereby realigning the sensors. The over extend sensor provides notice of loss of bellows service control which lights a caution light and arms a master caution light for warning the pilot of the condition. The circuitry has a power-up feature that allows the drive motor to match up the bellows target with the proximity sensors.

It is noted that the embodiment of the density altitude compensator described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A helicopter tail rotor authority altitude compensator comprising:
   a) a sealed bellows with one end fixedly secured and a moving end which moves linearly by retracting and extending in response to ambient pressure and temperature changes,
   b) a variable geometry linkage member connected between a manual tail rotor pitch input control linkage and an output tail rotor pitch control linkage wherein the variable geometry linkage member alters a maximum output tail rotor pitch control linkage movement based on a given input tail rotor control linkage movement, c) a means for transferring the linear movement of the moving end of the bellows to varying the geometry of the variable geometry control linkage through a variable range corresponding to a maximum retraction to a maximum extension of the bellows moving end, wherein the means transfers linear movement of the moving end of the bellows caused by a maximum retraction of the bellows resulting from increased ambient air pressure or decreased air temperature to the variable geometry control linkage which alters the geometry of the variable geometry control linkage so that a maximum manual input control linkage movement results in a minimum output tail rotor control linkage movement, and wherein the means transfers linear movement of the moving end of the bellows caused by a maximum extension of the bellows resulting from decreased ambient air pressure or increased air temperature to the variable geometry control linkage which alters the geometry of the variable geometry control linkage so that a maximum manual input control linkage movement results in a maximum output tail rotor control linkage movement, and d) wherein the means for transferring the linear movement of the moving end of the bellows to varying the geometry of the variable geometry control linkage through a variable range corresponding to a maximum retraction to a maximum extension of the bellows moving end further comprises: a target attached to the moving end of the bellows, a proximity sensor mounted to a proximity sensor mount wherein the proximity sensor is mounted to align with and sense the target attached to the bellows and wherein the proximity sensor mount is mounted for linear movement in parallel with the linear movement of the target, a drive motor with a drive shaft engaged with the proximity sensor mount to linearly move the proximity sensor mount in alignment with the target and the drive shaft is further engaged with the variable geometry control linkage, and electrical circuitry which receives signals from the proximity sensor and which sends electrical signals to the drive motor thereby operating the drive motor to align the proximity sensor with the target while concurrently altering the geometry of the variable geometry control linkage.

2. The helicopter tail rotor authority altitude compensator of claim 1 wherein the target and proximity sensor further comprise: a target positioned between two proximity sensors, wherein one proximity sensor is an extend sensor and the other proximity sensor is a retract sensor, whereby the extend sensor detects target movement as a result of decreasing ambient air pressure and or increasing ambient temperatures and sends a signal to the electrical circuitry thereby operating the drive motor to realign the target between the proximity sensors by linearly moving the proximity sensor mount while concurrently altering the variable geometry control linkage so that a given manual tail rotor pitch input control linkage movement provides a decreased output tail rotor control linkage movement and whereby the retract sensor detects target movement as a result of increasing ambient air pressure and or decreasing ambient temperatures and sends a signal to the electrical circuitry thereby operating the drive motor to realign the target between the proximity sensors by linearly moving the proximity sensor mount while concurrently altering the variable geometry control linkage so that a given manual tail rotor pitch input control linkage movement provides an increased output tail rotor control linkage movement.

3. The helicopter tail rotor authority altitude compensator of claim 1, wherein the variable geometry control linkage further comprises a pivoting variable geometry control linkage member connected between a manual tail rotor pitch input control linkage and a output tail rotor pitch control linkage, an input bearing positioned on one end of the pivoting variable geometry control linkage member for pivotally connecting the manual tail rotor pitch input control linkage to the pivoting variable geometry control linkage member, an output bearing positioned at an opposing end from the input bearing for pivotally connecting the output tail rotor pitch control linkage to the pivoting variable geometry control linkage member, a pivot bearing for pivotally mounting the pivoting variable geometry control linkage member and where the pivoting bearing is slidably and variably positioned between the input and output bearings and where the pivot bearing is slidably adjustable from a position where maximum manual tail rotor pitch input control linkage movement provides minimal output tail rotor pitch control linkage movement to a position where maximum manual tail rotor pitch input control linkage movement provides maximum output tail rotor pitch control linkage movement.

4. The helicopter tail rotor authority altitude compensator of claim 1 wherein the variable geometry control linkage further comprises a pivoting variable geometry control linkage member connected between a manual tail rotor pitch input control linkage and a output tail rotor pitch control linkage, an input bearing positioned on one end of the pivoting variable geometry control linkage member for pivotally connecting the manual tail rotor pitch input control linkage to the pivoting variable geometry control linkage member, an output bearing positioned at an opposing end from the input bearing for pivotally connecting the output tail rotor pitch control linkage to the pivoting variable geometry control linkage member, a pivot bearing for pivotally mounting the pivoting variable geometry control linkage member and where the pivoting bearing is mounted within a pivot bearing mounting block which is slidably and variably positioned between the input and output bearings and where the pivot bearing is slidably adjustable from a position where maximum manual tail rotor pitch input control linkage movement provides minimal output tail rotor pitch control linkage movement to a position where maximum manual tail rotor pitch input control linkage movement provides maximum output tail rotor pitch control linkage movement and wherein the drive motor and drive motor shaft further comprise: an acme threaded drive shaft positioned perpendicular to a center axis of the pivot bearing and threadingly engaged to the pivot bearing mounting block wherein the pivot bearing mounting block is slidingly engaged within a groove longitudinally positioned between the input and output bearing so that as the mounting block slides within the longitudinal groove the pivot bearing is relocated in relation to either the input and output bearing, the acme threaded drive shaft is further threadingly engaged to the proximity sensor mount so that upon shaft rotation the proximity sensor mount and the pivot bearing mounting block are concurrently relocated.

5. The helicopter tail rotor authority altitude compensator of claim 3, wherein the drive motor further comprises a remotely positioned electric drive motor coupled to the pivot bearing mounting block with a flexible shaft for slidably adjusting the position of the pivot bearing between the input bearing and the output bearing.

6. The helicopter tail rotor authority altitude compensator of claim 3 wherein the target and proximity sensors further comprise: a means for detecting over extension of the target where the target has moved to a position other than between the proximity sensors and further a means for relocating the proximity sensors so that the target is positioned between the extend and retract proximity sensors.

7. The helicopter tail rotor authority altitude compensator of claim 6 wherein the means for detecting over extension of the target where the target has moved to a position other than between the proximity sensors and further the means for relocating the proximity sensors so that the target is positioned between the extend and retract proximity sensors further comprises:
   a) two over extend sensors wherein one over extend sensor is mounted adjacent to the extend sensor and not between the extend and retract sensor and the other over extend sensor is mounted adjacent to the retract sensor and not between the extend and retract sensor, and further wherein both over extend sensors are mounted to the proximity sensor mount,
   b) electrical circuitry for detecting over extension of the target and repositioning the target between the extend and retract sensors wherein the electrical circuitry which receives an electrical signal from a given over extend sensor when the target is in alignment with the over extend sensor and wherein the electrical circuitry sends electrical signals to the drive motor to rotate the drive shaft in an appropriate direction to align the target between the extend and retract proximity sensors.

8. A helicopter tail rotor authority altitude compensator comprising:
   a) a pivoting variable geometry control linkage member connected between a manual tail rotor pitch input control linkage and a output tail rotor pitch control linkage, an input bearing positioned on one end of the pivoting variable geometry control linkage member for pivotally connecting the manual tail rotor pitch input control linkage to the pivoting variable geometry control linkage member, an output bearing positioned at an opposing end from the input bearing for pivotally connecting the output tail rotor pitch control linkage to the pivoting variable geometry control linkage member, a pivot bearing for pivotally mounting the pivoting variable geometry control linkage member and where the pivoting bearing is slidably and variably positioned between the input and output bearings and where the pivot bearing is slidably adjustable from a position where maximum manual tail rotor pitch input control linkage movement provides minimal output tail rotor pitch control linkage movement to a position where maximum manual tail rotor pitch input control linkage movement provides maximum output tail rotor pitch control linkage movement,
   b) a sealed bellows with one end fixedly secured and a moving end which moves linearly by retracting and extending in response to ambient pressure and temperature changes,
   c) a proximity sensor mounted on a proximity sensor mount wherein the sensor detects linear movement of the moving end of the bellows,
   d) an actuator coupled to the pivot bearing for slidably adjusting the position of the pivot bearing between the input bearing and the output bearing, and wherein the actuator is also coupled to the proximity sensor mount which provides linear movement of the proximity sensor corresponding to linear movement of the moving end of the bellows, e) electrical circuitry which receives electrical signals from the proximity sensor and sends electrical signals to the actuator to slidably adjust the position of the pivot bearing in relation to the linear movement of the moving end of the bellows and further to concurrently adjust the position of the proximity sensor mount so that the proximity sensor remains in alignment with the moving end of the bellows.

9. The helicopter tail rotor authority altitude compensator of claim 8, wherein the actuator further comprises an electric drive motor.

10. The helicopter tail rotor authority altitude compensator of claim 8, wherein the actuator further comprises an electric drive motor with an acme threaded shaft positioned perpendicular to a center axis of the pivot bearing and threadingly engaged to a pivot bearing mounting block wherein the pivot bearing mounting block is slidingly engaged within a groove longitudinally positioned between the input and output bearing so that as the mounting block slides within the longitudinal groove the pivot bearing is relocated in relation to either the input and output bearing.

11. The helicopter tail rotor authority altitude compensator of claim 8, wherein the actuator further comprises a remotely positioned electric drive motor coupled to the pivot bearing with a flexible shaft for slidably adjusting the position of the pivot bearing between the input bearing and the output bearing.

12. The helicopter tail rotor authority altitude compensator of claim 10, wherein the actuator further comprises a remotely positioned electric drive motor coupled to the an acme threaded shaft with a flexible shaft wherein the acme threaded shaft is positioned perpendicular to a center axis of the pivot bearing and threadingly engaged to a pivot bearing mounting block wherein the pivot bearing mounting block is slidingly engaged within a groove longitudinally positioned between the input and output bearing so that as the mounting block slides within the longitudinal groove the pivot bearing is relocated in relation to either the input and output bearing.

13. The helicopter tail rotor authority altitude compensator of claim 8 wherein the bellows further comprises a target attached to the moving end of the bellows and wherein the target moves linearly and adjacent to the proximity sensor.

14. The helicopter tail rotor authority altitude compensator of claim 8 wherein the proximity sensor comprises at least two sensors one mounted to extension movement of the moving end of the bellows and one mounted to detect retraction movement of the moving end of the bellows and wherein the bellows further comprises a target attached to the moving end of the bellows and wherein the target is maintained between the two proximity sensors.

15. The helicopter tail rotor authority altitude compensator of claim 14 wherein the proximity sensor further comprise a proximity sensor mounting block with at least one proximity sensor mounted thereto, the mounting block includes a threaded hole which receives a threaded actuator drive shaft so that as the actuator drive shaft rotates, the mounting block moves linearly and parallel with the linear movement of the bellows moving end aligning the proximity sensor with the moving end of the bellows.

16. The helicopter tail rotor authority altitude compensator of claim 15 further comprising a means for detecting over extension of the target where the target has moved to a position other than between the proximity sensors and further a means for relocating the proximity sensors so that the target is positioned between the extend and retract proximity sensors.

17. The helicopter tail rotor authority altitude compensator of claim 16 wherein the means for detecting over extension of the target where the target has moved to a position other than between the proximity sensors and further the meads for relocating the proximity sensors so that the target is positioned between the extend and retract proximity sensors further comprises:
  a) two over extend sensors wherein one over extend sensor is mounted adjacent to the extend sensor and not between the extend and retract sensor and the other over extend sensor is mounted adjacent to the retract sensor and not between the extend and retract sensor, and further wherein both over extend sensors are mounted to the proximity sensor mount,
  b) electrical circuitry for detecting over extension of the target and repositioning the target between the extend and retract sensors wherein the electrical circuitry which receives an electrical signal from a given over extend sensor when the target is in alignment with the over extend sensor and wherein the electrical circuitry sends electrical signals to the drive motor to rotate the drive shaft in an appropriate direction to align the target between the extend and retract proximity sensors.

\* \* \* \* \*